United States Patent [19]

Komoto

[11] Patent Number: 4,955,240

[45] Date of Patent: Sep. 11, 1990

[54] VIBRATION TYPE FORCE DETECTOR

[75] Inventor: Akira Komoto, Fujio Okumachi, Japan

[73] Assignee: Shimadzu Corporation, Japan

[21] Appl. No.: 412,428

[22] Filed: Sep. 26, 1989

[30] Foreign Application Priority Data

Sep. 30, 1988 [JP] Japan ............................ 63-248879

[51] Int. Cl.$^5$ ..................... G01L 1/10; G01G 3/16
[52] U.S. Cl. ..................... 73/862.59; 73/DIG. 1; 177/210 FP
[58] Field of Search ............ 73/862.59, 517 AV, 704, 73/778, 580, 581, DIG. 1; 177/210 FP

[56] References Cited

U.S. PATENT DOCUMENTS 4,194,649  3/1980  Bullivan et al. ............... 73/DIG. 1
4,418,774 12/1983  Whitney et al. ............. 177/210 FP Primary Examiner—Charles A. Ruehl
Attorney, Agent, or Firm—Fidelman & Wolffe

[57] ABSTRACT

A vibration type force detector comprising: a string to which a force to be measured is applied in the direction in which the string is tensioned; a driver for causing the string to vibrate at its natural frequency and simultaneously producing a series of pulses at a frequency in synchronism with the vibration of the string; a gate to which the series of pulses are applied; a counter for counting the series of pulses that have passed through the gate; means for providing a gating time determined in accordance with the result of the counting of the counter; and a controller for controlling the gate in accordance with the gating time. The gating time providing means is so arranged that as the vibration frequency of the string increases, the gating time lengthens.

3 Claims, 4 Drawing Sheets

VIBRATION TYPE FORCE DETECTOR

BACKGROUND OF THE INVENTION

This invention relates to a vibration type force detector for detecting a force acting on a string in the direction in which the string is tensioned by measuring the vibration frequency of the string. The invention utilizes the fact that the natural vibration frequency of a string depends upon the magnitude of the tension of the string. The force detector of the invention may be used as, for example, a load sensor in an electronic balance.

In force detectors of this type, while a force to be measured is applied to a string in the direction in which the string is tensioned, the string is vibrated laterally at its natural frequency by means of an oscillator, and the vibration frequency of the string is measured to detect the magnitude of the force. To measure the vibration frequency of the string, the number of the vibration may be counted for a certain period of time, or the cycle of the vibration may be measured.

The relation between the natural vibration frequency f of a string and the tension F thereof is expressed by the equation $$f = \frac{1}{2l} \sqrt{\frac{F}{\rho}} \quad (1)$$

wherein $\rho$ is the mass per unit length of the string and $l$ is the length of the string. The equation means that the vibration frequency f changes in proportion to the square root of the tension F. Therefore, as the force F to be measured increases, the vibration frequency f of the string changes more and more gradually even when the force F changes the same amount, so that the amount of change of the number of vibration counted for the same period of time or the cycle of the vibration becomes smaller and smaller. This means that the greater the amount to be measured is in a measuring range, the lower the resolving power of the detector becomes.

If the vibration type force detector is used in an electronic balance, there will be an advantage that as the load to be measured increases, measurement may be made on a more and more coarse scale. If the tare of a sample to be measured, however, is great as compared with the contents thereof, the tare must be deducted for correct measurement of the contents of a small weight. In such a case the conventional vibration type force detectors are not suitable for use.

Japanese unexamined patent publication No. 48-30474 discloses a method of improving the resolving power uniformly within a measuring range by multiplying the frequency of the pulses produced in synchronism with the vibration of the string and counting the multiplied pulses within a predetermined period of time. Even with this method, however, the resolving power of the detector is kept different at the higher and lower portions of the measuring range.

SUMMARY OF THE INVENTION

The object of the invention is, therefore, to provide a vibration type force detector the resolving power of which is kept constant even when the force to be measured becomes great.

Briefly stated, the force detector of the invention comprises: a string to which a force to be measured is applied in the direction in which the string is tensioned; a driver for causing said string to vibrate at its natural frequency and simultaneously producing a series of pulses at a frequency in synchronism with the vibration of said string; a gate to which said series of pulses are applied; a counter for counting said series of pulses that have passed through said gate; means for providing a gating time in accordance with the result of the counting of said counter; and a controller for controlling said gate in accordance with said gating time. The means for providing a gating time is so arranged that as the vibration frequency of the string increases, the gating time lengthens. A multiplier may be provided between the driver and the counter so as to multiply the frequency of the pulses to be applied to the counter, and means for displaying the magnitude of the foce may also be provided.

As the gating time for counting the number of vibration is lengthened, the resolving power is improved. By lengthening the gating time as the vibration frequency increases it is possible to prevent the tendency that as the force to be measured increases, the same amount of its change exerts less and less influence on the change of the vibration frequency. In other words, with the arrangement of the invention it is possible to prevent deterioration of the resolving power of the detector as the force to be measured increases.

If the gating time is changed in proportion to the square root of the counted value from the counter, the counted value becomes directly proportional to the change of the force being measured, so that the resolving power remains constant over the whole measuring range.

PREFERRED EMBODIMENTS OF THE INVENTION

Figure 1:
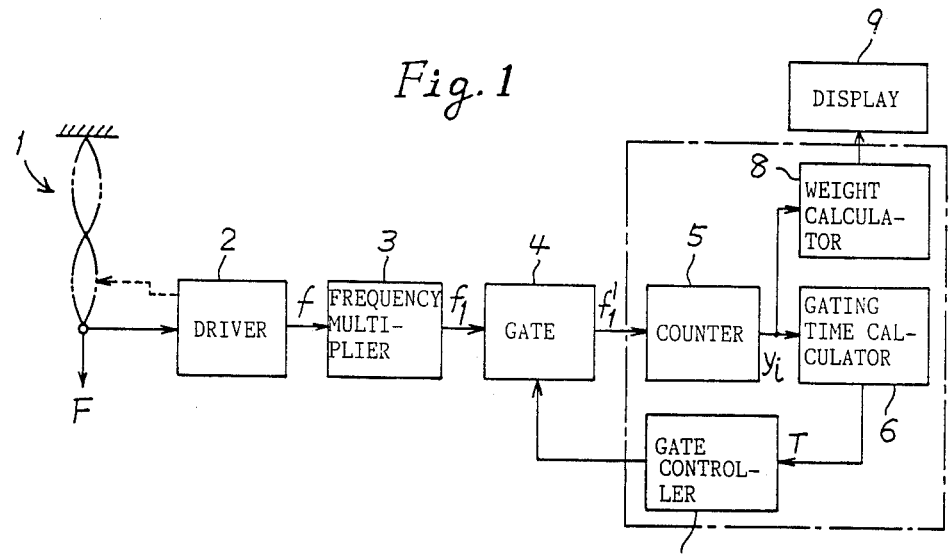
FIG. 1 is a block diagram of one embodiment of the invention.

Referring to FIG. 1 which illustrates in a block diagram one embodiment of the invention as applied to a balance, there is shown a vibration string 1, to which a load F placed on a weighing pan (not shown) of the balance is applied through a well known mechanism such as the Roberval type.

A driver 2 such as the one disclosed in Japanese unexamined patent publication No. 60-207027 causes the string 1 to vibrate at its natural frequency f. The relation between the vibration frequency of the string 1 and the load or tension F applied thereto is given as the above-mentioned equation (1).

The driver 2 produces a series of pulses at a frequency f in synchronism with the vibration of the string 1. Ford simplicity and convenience of illustration, the pulses and their frequencies are designated by the same reference symbols in this description of the invention. The frequency f of the output pulses from the driver 2 is multiplied by a frequency multiplier 3 composed of a phase-locked loop (PLL), so that the output pulses from the multiplier 3 have a frequency given as $$f_1 = k \cdot f \tag{2}$$

The pulses $f_1$ are applied to a gate 4.

The gate 4 is controlled by a gate controller 7 so that the gate opens for a gating time T at a predetermined cycle thereby to allow the input pulses $f_1$ to pass through the gate 4. The gating time T is variable in accordance with the command from the controller.

The pulses $f_1'$ that have passed through the gate 4 are applied to a counter 5, which counts the input pulses $f_1'$ during the gating time T and applies the counted value $y_i$ to a gating time calculator 6 and a weight calculator 8. The counter 5 is reset each time the gating time T has elapsed.

The weight calculator 8 calculates a load F on the basis of the counted values $y_i$ successively received from the counter 5 and subtracts the tare from the load in a well-known manner thereby to determine the weighed value of the sample being measured. The weighed value is displayed on a display 9.

On the basis of the counted value $y_i$ from the counter 5 the gating time calculator 6 calculates a gating time T for the gate 4 in a manner to be described hereinbelow and applies the calculated time T to the gate controller 7, which controls the gate 4 so that the gate opens for the gating time T only.

Figure 2:
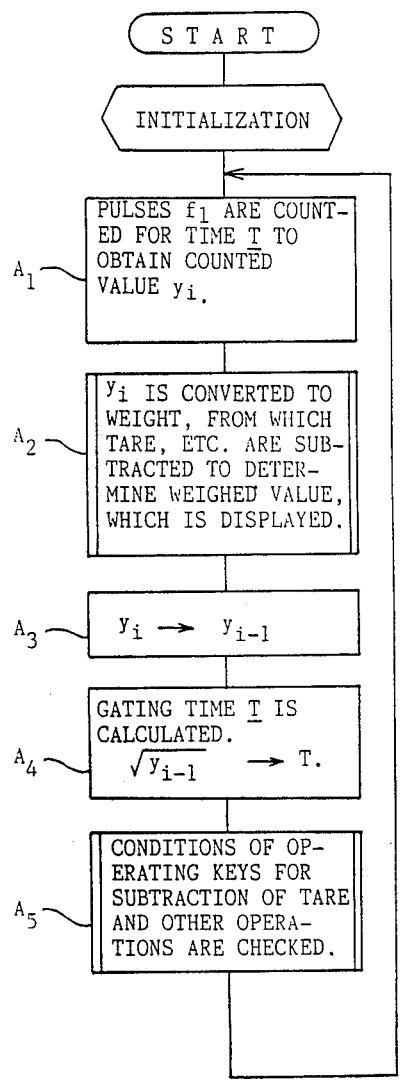
FIG. 2 is a flowchart showing the steps for operating the device shown in FIG. 1.

In practice, the counter 5, the gating time calculator 6, the gate controller 7 and the weight calculator 8 are composed of a microcomputer, which operates in accordance with a predetermined program such as shown in the flowchart of FIG. 2.

The operation of the apparatus shown in FIG. 1 will now be discribed with reference to FIG. 2.

After initialization, the output pulses $f_1$ from the frequency multiplier 3 are counted for the gating time T at step $A_1$. At step $A_2$ the tension acting on the string 1, that is, the load F is calculated from the counted value $y_i$ by an equation to be given as (7) hereinbelow, and the tare is subtracted from the load to determine the weighed value, which is displayed on the display 9.

Using the counted value $y_{i-1}$ immediately before the counted value $y_i$, the gating time T is determined by $$T = \sqrt{y_{i-1}} \tag{3}$$

In particular, each time the weighed value is determined on the basis of a counted value $y_i$, the counted value $y_i$ is made a factor $y_{i-1}$ for determining the gating time T for the next counting operation at step A3, and the next gating time T is calculated by the equation (3) at step A4.

The microcomputer is provided with a plurality of operation keys, which are not shown in the figures, including a key for conducting the operation of subtracting the tare from the weighed value. At step A5 the operating conditions of those keys are checked, and the next counted value $y_i$ is obtained again at step A1.

As shown in the equation (3), the gating time T changes in proportion to the square root of the counted value $y_{i-1}$ produced by the counter 5 in the previous counting operation.

Figure 3:
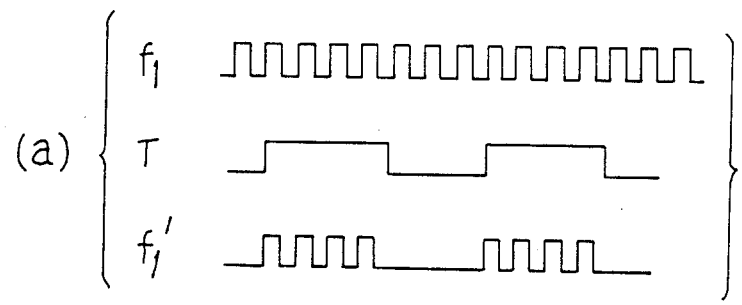
FIG. 3 is a time chart showing the waveforms of the signals from some of the components of the device shown in FIG. 1.
Figure 3:
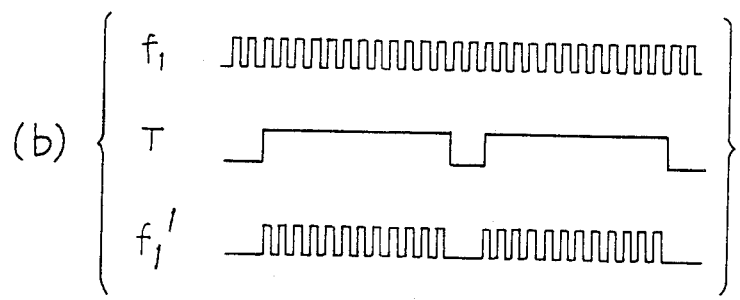

FIG. 3 shows the waveforms of the output signals from the circuits 3, 4 and 6 in FIG. 1. Under the condition shown in FIG. 3a, as the load F is increased, the frequency $f_1$ increases and at the same time the gating time T lengthens. The counted value $y_i$ of the pulses $f_1$ during the gating time T is $$y_i = f_1 \cdot T \tag{4}$$

Substituting the equation (3) into the equation (4), we have $$y_i = f_i \cdot \sqrt{y_{i-1}} \tag{5}$$

Since the counted value $y_i$ is made a factor $y_{i-1}$ for determining the gating time T for the next operation of counting the pulses, repetition of the counting operation will cause the counted value y to converge into $$y = f_1^2 \tag{6}$$

Substituting the equations (1) and (2) into the equation (6), we obtain $$y = \frac{k^2}{4l^2} \cdot \frac{F}{\rho} \tag{7}$$

Thus, the counted value y is directly proportional to the tension or load F, so that the resolving power is kept constant regardless of the magnitude of the force F, and at the same time the relation between the force to be measured and the counted value is linearized.

Figure 4:
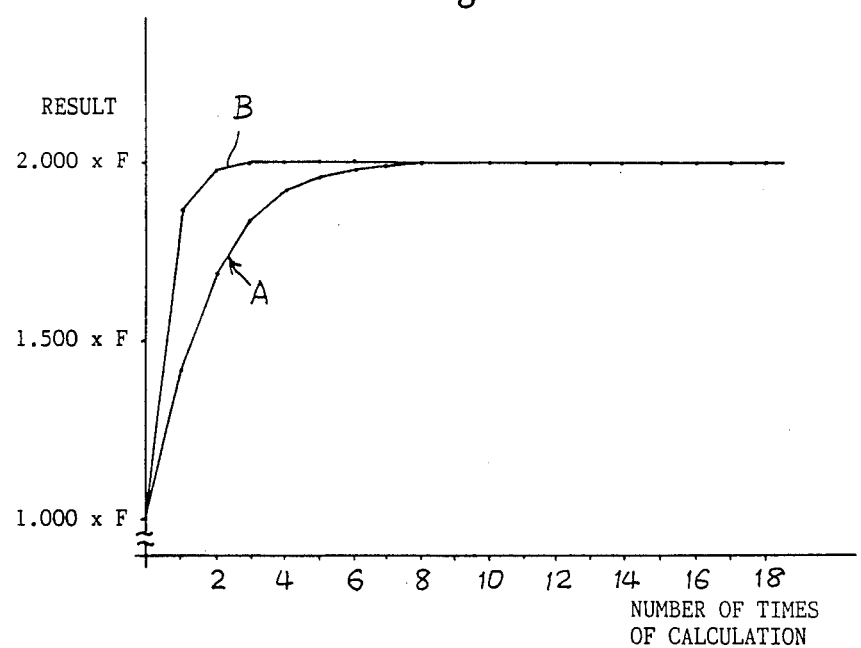
FIG. 4 is a graph showing the responsivity of the different embodiments of the invention.

In the above embodiment, when the load has changed instantly from the initial value F to 2F, the detector responds to the change in the manner shown at A in FIG. 4, and when the operation has been repeated fifteen (15) times, the counted value y becomes $1.99996 \times F$, with the residual being $1/5 \times 10^{-4}$. With a balance having an accuracy of $\frac{1}{2} \times 10^{-4}$, when the operation has been repeated fifteen times, the measured value becomes readable.

As shown at A in FIG. 4, the change of the counted value lags behind the change of the load or the vibration frequency of the string. This means that when the vibration frequency changes due to external disturbances, the change of the counted value is smaller than the change of the vibration frequency, with a resulting advantage that the device has the function of a digital filter.

To improve the responsibility, instead of the counted value $y_{i-1}$ the difference p between the gating time that should be in accordance with the vibration frequency $f_o$ of the string 1 and the present gating time may be used as a factor for determining the gating time.

Figure 5:
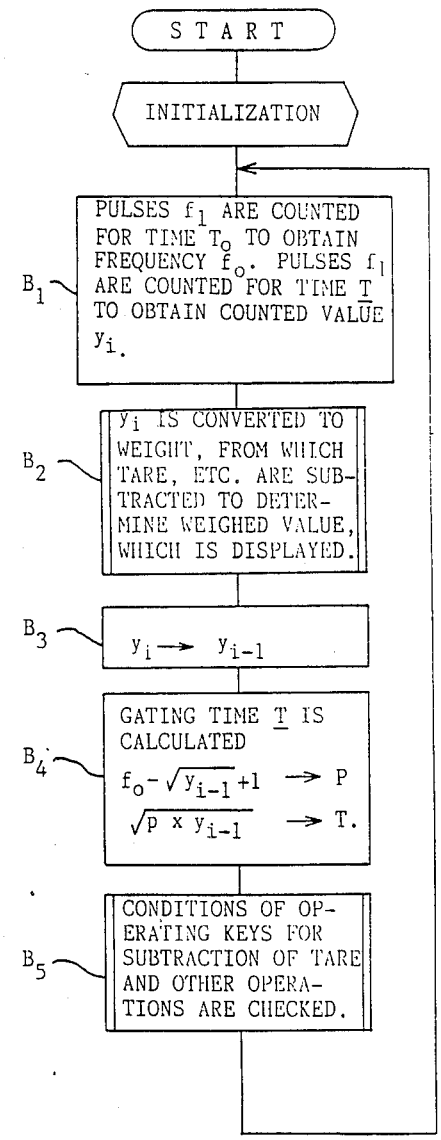
FIGS. 5 and 6 are flowcharts showing the steps for operating the different embodiments of the invention.

FIG. 5 shows a flowchart of a program with the difference p used as a factor for determining the gating time T. The program of FIG. 5 differs from that of FIG. 2 in steps B1 and B4. In this embodiment the vibration frequency $f_o$ is obtained by counting the pulses $f_1$ for a fixed gating time $T_o$, and using the difference p and the counted value $y_{i-1}$ which are related by $$p = f_o - \sqrt{y_{i-1}} + 1 \tag{8}$$

the gating time T is calculated by $$T = \sqrt{p \cdot y_{i-1}} \tag{9}$$

so that the gating time T is changed faster at a speed corresponding to the difference between the vibration frequency of the string and the counted value of the pulses. In this case the counted value $y_i$ at step $B_1$ is $$y_i = f_1 \cdot \sqrt{p \cdot y_{i-1}} \qquad (10)$$

and the responsivity of the detector is improved as shown at B in FIG. 4. In this case, if the load changes from F to 2F, upon repetition of the operation six times the counted value becomes $1.999970 \times F$, whereupon the measured value becomes readable on a balance having an accuracy of $\frac{1}{2} \times 10^{-4}$.

By changing the manner in which the coefficient p of the equation (8) is formed it is possible to freely change the function of the detector as a filter.

In the above embodiments the gating time T is changed in direct proportion to the square root of the counted value $y_{i-1}$. The invention is not limited to this way of changing the gating time, but the time T may be changed either in different proportional relationships with the counted value, or stepwise.

Figure 6:
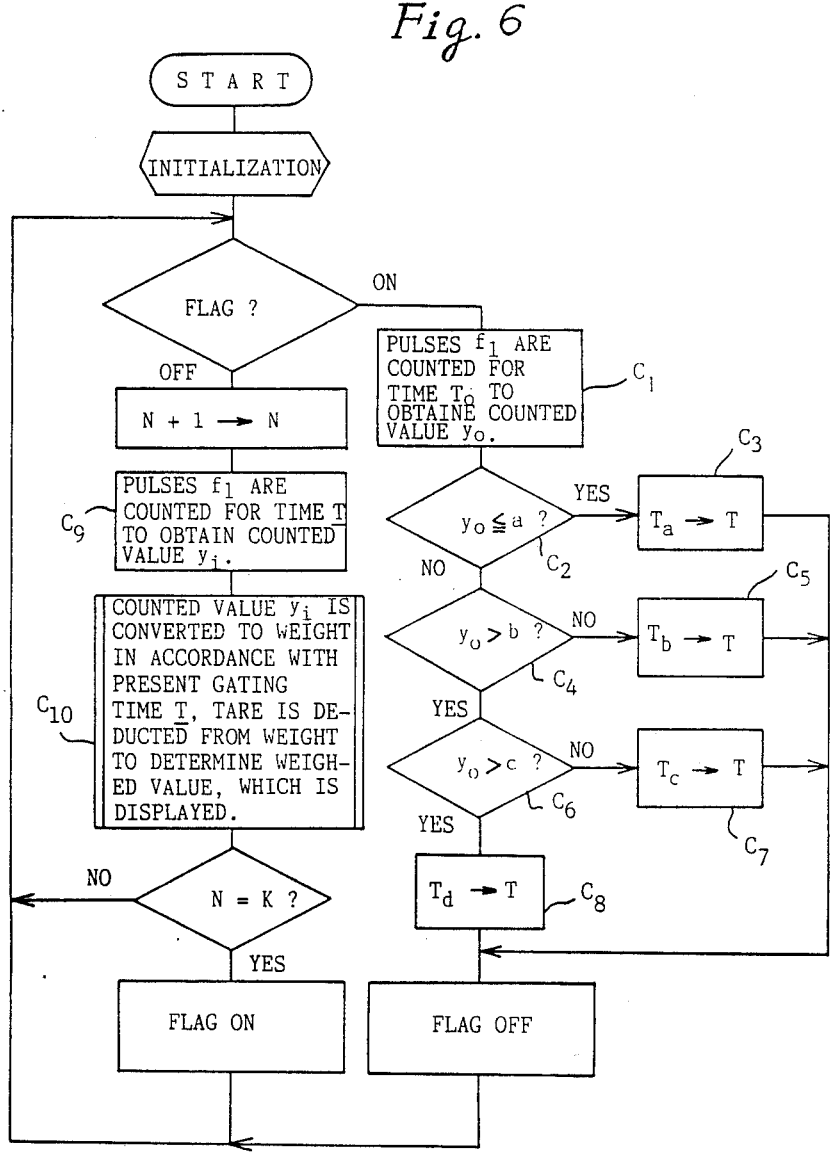

FIG. 6 is a flowchart of a program in which the gating time T is changed stepwise. In this case, four different times $Ta$, $Tb$, $Tc$ and $Td$ corresponding to four predetermined different vibration frequency ranges of the string are preset, and the vibration frequency is measured periodically so that one of the times $ta \sim Td$ which corresponds to the measured frequency is selected as the gating time T.

At step $C_1$, the pulses $f_1$ are counted for a predetermined period of time $T_o$, and the counted value $y_o$ is compared successively with preset values a, b and c to determine the gating time. In particular, at step $C_2$ the value $y_o$ is compared with the preset value a, and if $Y_o \leq a$, the time $Ta$ is selected as the gating time T at step $C_3$. If $Y_o > a$, the value $Y_o$ is compared with the preset value b at step $C_4$, and if $Y_o \leq b$, the time $Tb$ is selected as the gating time T at step $C_5$. If $Y_o > b$, the value $Y_o$ is compared with the preset value c at step $C_6$, and if $Y_o \leq C$, the time $Tc$ is selected as the gating time T at step $C_7$. If $Y_o > C$, the time $Td$ is selected as the gating time at $C_8$.

The pulses $f_1$ produced during the gating time T selected in the above-mentioned manner are counted at step $C_9$, and the weighed value of the object being measured is determined by the counted value $y_1$ at step $C_{10}$. To convert the value $Y_i$ to a correspondiing weight, it is necessary to use that one of predetermined conversion coefficients which corresponds to that one of the times $Ta$ to $Td$ which has been selected as the present gating time.

In the program of FIG. 6, the counted value $Y_i$ to determine the weight cannot be obtained during the execution of the gating time selecting mode. To avoid the inconvenience, in addition to the counter for counting the pulses $f_1$ for the variable gating time T, another counter may be provided for counting the pulses $f_1$ for the fixed gating time $T_o$, so that the two counters are operated in parallel for counting the pulses $f_1$.

In the above described embodiments, the pulses f produced by the driver 2 in synchronism with the vibration of the string 1 are multiplied by the multiplier 3 by a factor of k and the multiplied pulses $f_1$ are counted so that the resolving power is improved substantially uniformly over the whole measuring range. The multiplier 3 may be omitted and the pulse f may be applied directly to the gate 4.

As described above, in accordance with the invention the gating time for counting the vibration frequency of the string is lengthened as the frequency increases, so that it is possible to prevent deterioration of the resolving power which would otherwise be caused to occur by the increase of the force to be measured.

In particular, by increasing the gating time in direct proportion to the square root of the vibration frequency it is possible to keep the resolving power of the detector constant over the whole measuring range and have the counted value of the vibration frequency and the force being measured in direct proportion to each other and improve the linearity. The linearity may be further improved by additional compensation by the method of least squares or Lagrange's interpolation.

Since the detector is so constructed that the gating time for the present counting operation is determined by the counted value obtained by the preceeding counting operation, it has the function of a digital filter and is able to remove external disturbances. By changing the coefficient to determine the gating time it is possible to freely change the efficiency of the filter.

What I claimed is:

1. A vibration type force detector comprising: a string to which a force to be measured is applied in the direction in which the string is tensioned; a driver for causing said string to vibrate at its natural frequency and simultaneously producing a series of pulses at a frequency in synchronism with the vibration of said string; a gate to which said series of pulses are applied; a counter for counting said series of pulses that have passed through said gate; means for providing a gating time determined in accordance with the result of the counting of said counter; and a controller for controlling said gate in accordance with said gating time; said gating time providing means being so arranged that as the vibration frequency of said string increases, said gating time lengthens.

2. The detector of claim 1, further including a multiplier for multiplying the frequency of said series of pulses.

3. The detector of claim 1, further including means for calculating the magnitude of said force in accordance with said result of said counting, and means for displaying said magnitude.

* * * * *